United States Patent [19]

Cho

[11] Patent Number: 5,070,312
[45] Date of Patent: Dec. 3, 1991

[54] PULSE WIDTH MODULATION CIRCUIT OF PROGRAMMABLE SUBFRAME SYSTEM

[75] Inventor: Dong S. Cho, Anyang, Rep. of Korea

[73] Assignee: Goldstar Electron Co., Ltd., Cheongju, Rep. of Korea

[21] Appl. No.: 574,646

[22] Filed: Aug. 29, 1990

[30] Foreign Application Priority Data

Aug. 31, 1989 [KR] Rep. of Korea ............. 89-12487(U)

[51] Int. Cl.⁵ .............................................. H03K 7/08
[52] U.S. Cl. .................................... 332/109; 332/106
[58] Field of Search ............... 332/106, 109, 110, 111; 307/265; 328/59; 341/145

[56] References Cited

U.S. PATENT DOCUMENTS 4,567,468 1/1986 Tanaka ................................. 341/145

Primary Examiner—David Mis
Attorney, Agent, or Firm—Blakely, Sokoloff, Taylor & Zafman

[57] ABSTRACT

A PWM circuit of programmable subframe system includes a control circuit 20 for generating control signals Cm-CO according to the number of subframes, a PWM data register 60 for storing PWM data, a comparison/correction circuit 40 for determining the sequence of connections of the counter and then comparing the value of a counter 30 with the value of the register 60 to generator overflows under the control of the control signals and also simultaneously generate correction signals, a counter 30 for determining the seqence of connections by the circuit 40 and counting-up to return the overflows to the circuit 40, a CMP OR Gate 70 for OR operating the correction signals generated in the circuit 40, a modulator 50 for setting and resetting the output and giving correction output.

2 Claims, 6 Drawing Sheets

FIG. I

PULSE WIDTH MODULATION CIRCUIT OF PROGRAMMABLE SUBFRAME SYSTEM

FIELD AND BACKGROUND OF THE INVENTION

The present invention relates to a PWM (Pulse Width Modulation) circuit of programmable subframe system and, in particular, to a PWM circuit of programmable subframe system that divides a frame into subframes to suit for modulation.

There are two conventional PWM methods, which are one Frame Method and Subframe Method of fixed number.

As shown in FIG. 8, an example of one Frame Method is the method which a counter counts up the input clocks and resets the PWM output when the value of data register becomes same to the value of the counter and repeats the setting of PWM output with overflow of the counter and varies the duty of PWM output according to the value of the data register.

The subframe method of fixed number is a method to modulate and output pulse width corresponding to the value of data register with dividing into several subframes.

Digital/Analog conversion can be mentioned as an example of application of PWM, and it is described in U.S. Pat. No. 4,567,468 filed by Japan Sharp (patented in Japan as JPN 59055623).

Because the conventional PWM method uses the One Frame Method or Subframe Method of fixed number, it has the defect to limit the output formation and then application extent.

SUMMARY OF THE INVENTION

The present invention is designed to eliminate the above disadvantage and employs a PWM circuit of a programmable subframe system. In the construction, as in FIG. 1, system clocks CK1 and CK2 and reset signal R are connected to modulator 50 and counter 30, which connects to comparison/correction circuit 40. Outputs Cm-Co of control circuit 20 including control register 20a connect to the comparison/correction circuit 40, which is connected to a PWM data register 60 and also is connected to the modulator 50 directly on one side and via an OR Gate 70 on the other side, the modulator 50 giving PWM signals.

Figure 1:
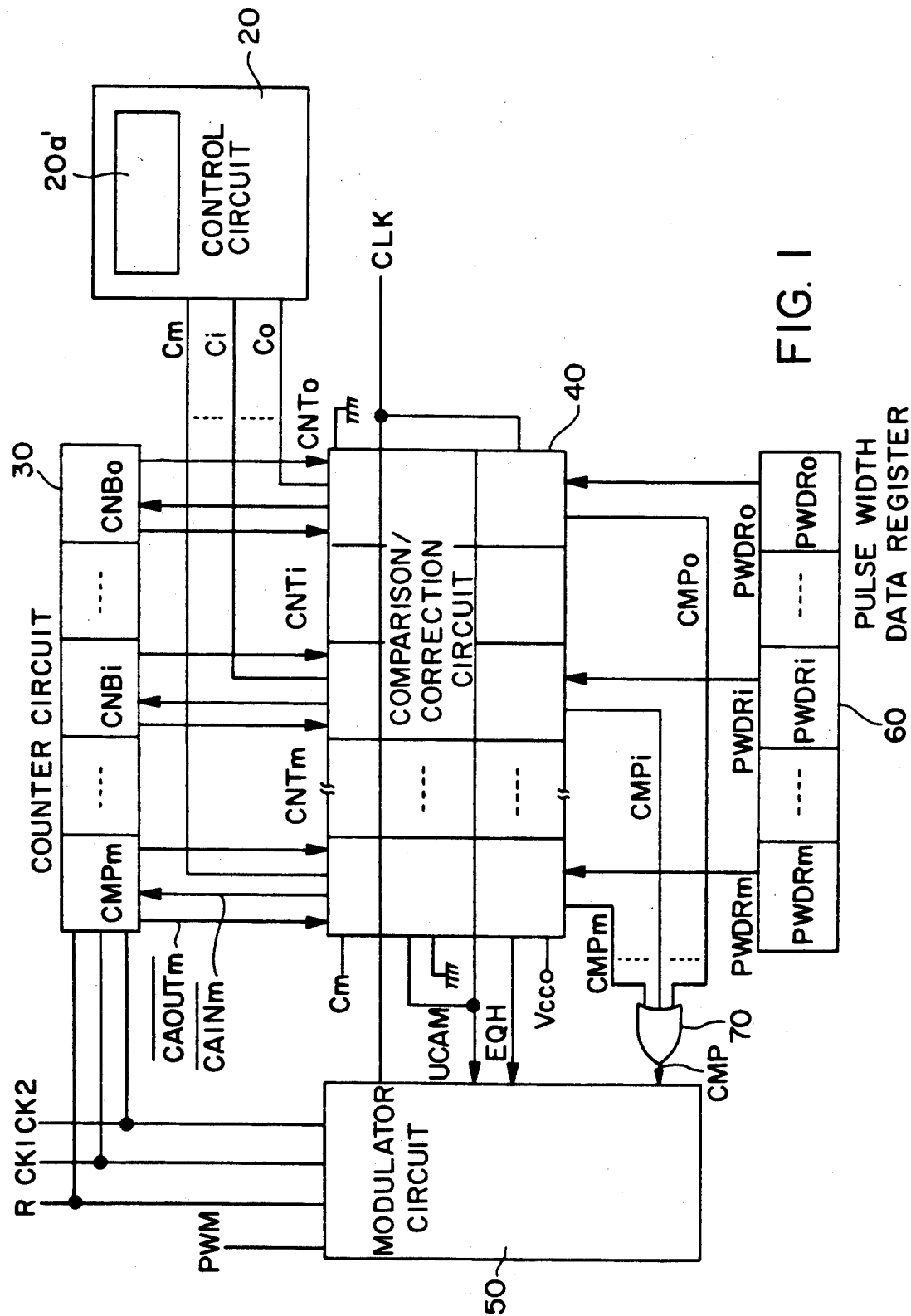
FIG. 1 is a PWM circuit of programmable subframe of the present system of present invention.

Numerals in the drawings indicate the following: 20 indicating a control circuit, 20a a control register, 30 a counter, 40 a comparison/correction circuit, 50 a modulator, 60 a PWM data register, 28, 70, 4R1 and 5R1 OR Gates, 21-23, 31, 4NA, 5NA1-5NA6 NAND Gates, 24, 32-26, 4I1-4I6 and 5I11-5I12 inverters, 25-27, 37, 38, 4N1-4N6 and 5N1-5N3 NOR Gates, 29, 39, 4A1-4A3, 5A1 and 5A2 AND Gates; 4T1-4T4 Transmission Gates.

DETAILED DESCRIPTION OF THE INVENTION

Referring to the drawings, the invention shall be described in details.

Figure 2:
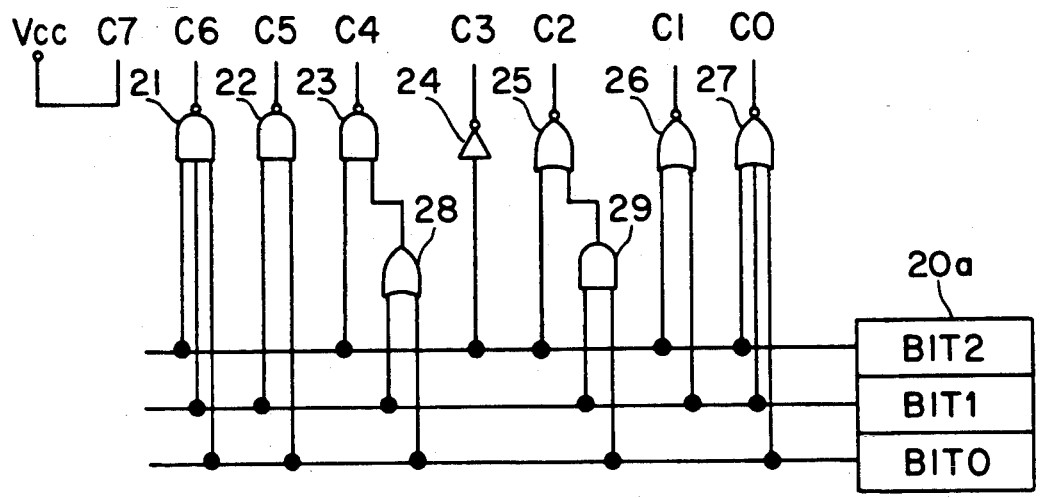
FIG. 2 is a circuit showing details of the control circuit in FIG. 1.
Figure 3:
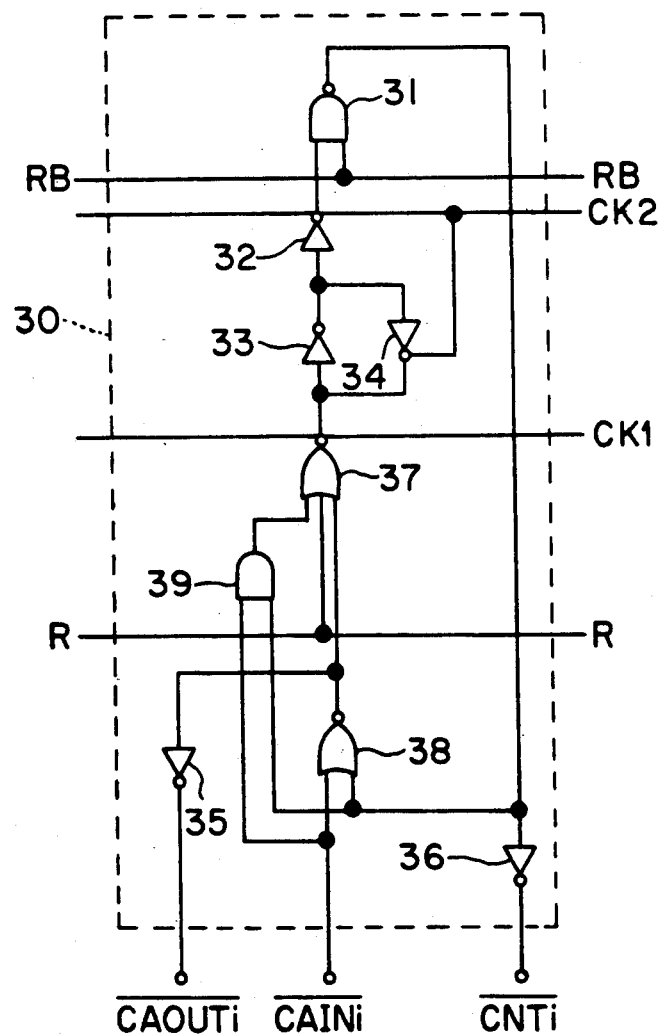
FIG. 3 shows details of the counter of the counter circuit in FIG. 1.

In FIG. 2 showing the detailed construction of the control circuit 20, bits of the control register 20a give control signals C0-C6 respectively via AND Gate 29, OR Gate 28, NOR Gates 25-27, inverter 24 and NAND Gates 21-23 to the comparison/correction circuit 40, with control signal C7 being given always in "High" level. In FIG. 3 showing details of the counter circuit 30, counter input terminal CAINi connects to inputs of NOR Gate 38 and AND Gate 39, the other inputs of the respective Gates connecting to the output terminal of NAND Gate 31, and the output terminal of the NOR Gate 38 connects with counter output terminal CAOUTi through an inverter 35 and also connects to the input of NOR Gate 37 together with the output of the AND Gate 39 and a reset terminal R. The output of the NOR Gate 37 connects to a system clock CK1 and also connects with the inputs of inverters 32 and 34 via an inverter 33, and the output of the inverter 34 connecting to the output of the NOR Gate 37 on one side and to the output of the inverter 32 and a system clock CK2.

The outputs of the inverters 32 and 33 connect to the input of the NAND Gate 31 together with the reversed reset signal RB, while the output of the NAND Gate 31 connects to the inputs of NOR Gate 38 and AND Gate 39 on one side and with a terminal CNTi through an inverter 36. The terminals CAINi, CAOUTi and CNTi respectively connect to the comparison/correction circuit 40. The counter 30 in FIG. 1 comprises counters of the above construction in the number corresponding to the number of bits.

Figure 4:
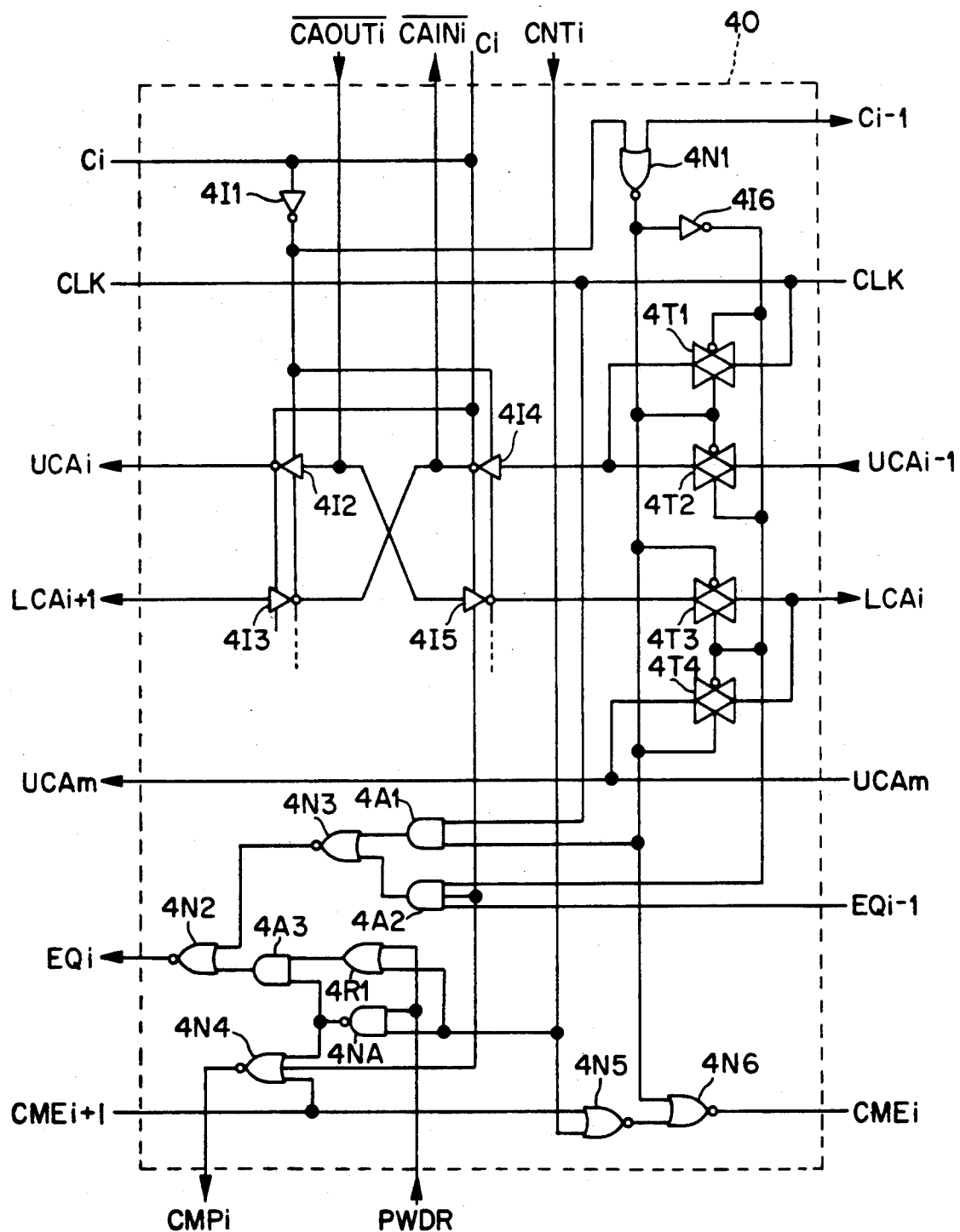
FIG. 4 shows details of the comparison/correction circuit in FIG. 1.

In FIG. 4 showing the detailed construction of the comparison/correction circuit 40 in FIG. 1, a control signal terminal Ci being connected to the control circuit 20 connects to the outputs of inverters 4I2 and 4I4 and also connects with the input of the NOR Gate 4N1 and the outputs of the inverters 4I3 and 4I5 via an inverter 4I1. The input and output terminals CAINi and CAOUTi of the counter 30 connect respectively to the outputs of the inverters 4I3 and 4I4 and to the inputs of the inverters 4I2 and 4I5. When the control signal is "1", the overflow UCAi-1 is received through a transmission Gate 4T2 to generate signal UCAi from the output of the inverter 4I2; when the control signal is "0", the overflow LCAi+1 of a higher bit is received through the input of the inverter 4I3 to generate the signal LCAi through a transmission Gate 4T3. The output of the NOR Gate 4N1 and the reverse output through the inverter 4I6 control the transmission Gates 4T1-4T4 and also respectively connect to AND Gates 4A1 and 4A2 and a NOR Gate 4N6 at their inputs. The output of the AND Gate 4A1 and 4A2 and a NOR Gate 4N6 at their inputs. The output of the AND Gate 4A1 being applied with input clock CLK at its other input and the output of another AND Gate 4A2 respectively connect to the input of a NOR Gate 4N3, whose output connecting to the output of a NOR GATE 4N2.

The output CNTi of the counter 30 and the output CMEI+1 of a higher counter together connect to the two inputs of a NOR Gate 4N5, whose output along with the output of the NOR Gate 4N1 applies to the input of a NOR Gate 4N6, its output CMEj+1(j=i−1) connecting to a terminal CMEi-1 of a lower counter. The output CNTi of the counter 30 along with the output PWDRj of the PWM data register 60 applies as input to the NAND Gate 4NA and OR Gate 4R1.

The output of the NAND Gate 4NA connects to the input of the NOR Gate 4N4 and also together with the output of the OR Gate 4R1 to the input of AND Gate 4A3, whose output and the output of the NOR Gate 4N3 together apply to the input of the NOR Gate 4N2 for it to give equivalence signal EQi. The control signal Ci connecting to the output of the inverter 4I4 connects to the input of the AND Gate 4A2 and the NOR Gate 4N4. Also, the output CMEi+1 of a higher counter connects to the input of the NOR Gate 4N4, which gives correction signal CMPi to the input of the CMP OR Gate 70. The comparison/correction circuit 40 in FIG. 1 comprises comparison/correction circuits of the above construction in connection in the number corresponding to that of bits.

Figure 5:
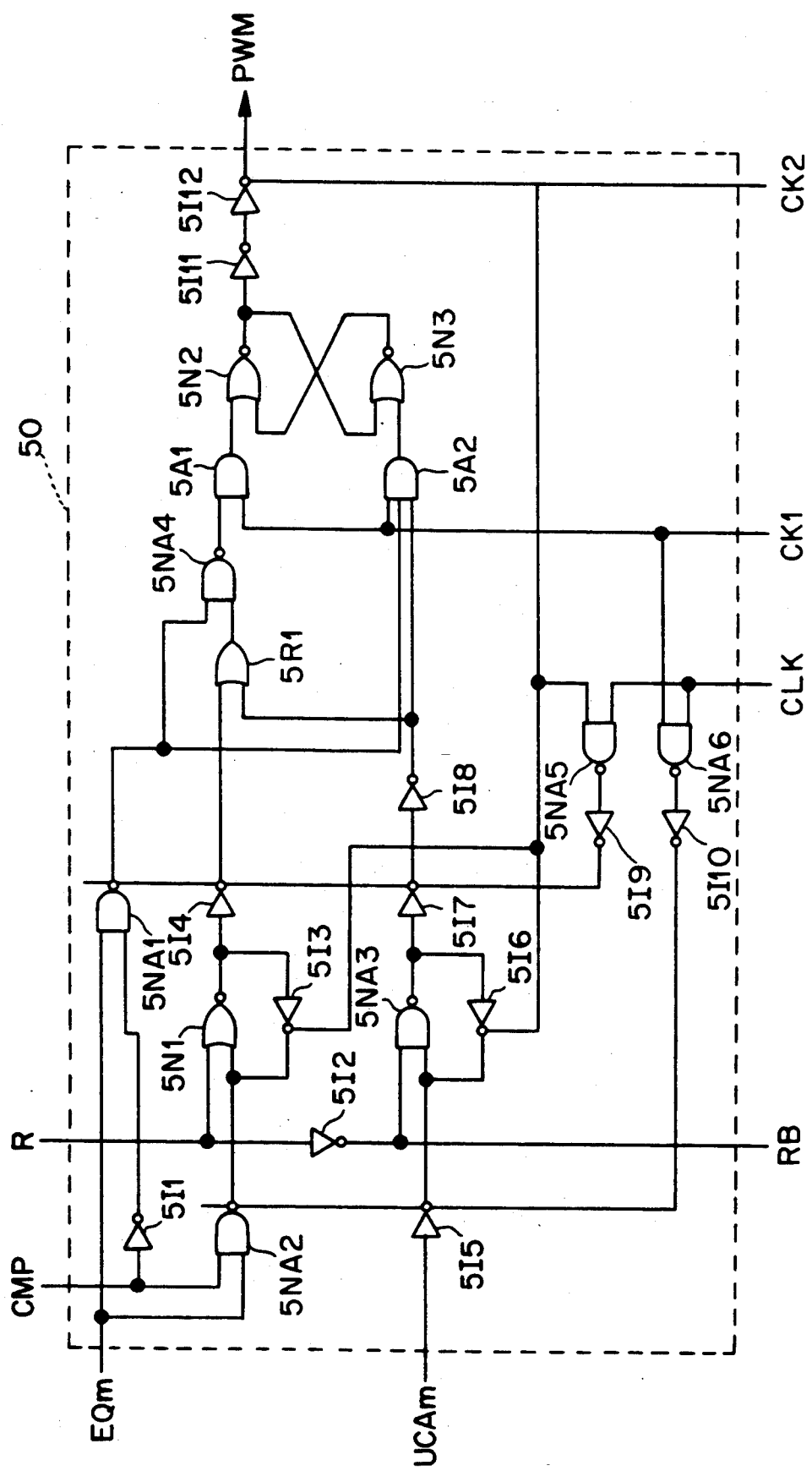
FIG. 5 shows details of the modulator circuit in FIG. 1.

In FIG. 5 showing the detailed construction of a modulator 50, an input terminal CMP for receiving the signals resulting from OR operation of correction signals CMPo-CMPm given by the comparison/correction circuit 40 connects via an inverter for 5I1 with an input of a NAND Gate 5NA1 and also connects to an input of a NAND Gate 5NA2, the other inputs of the NAND Gates 5NA1 and 5NA2 bother connecting to a terminal EQm. The output of the NAND Gate 5NA2 connects to the output of an inverter 5I5 connecting to a terminal UCAm and also connects to the inputs of the NOR Gate 5N1 and the NAND Gate 5NA3. A reset terminal R connects to the other input of the NOR Gate 5N1 and also connects with the other input of the NAND Gate 5NA3 and a reverse reset terminal RB through an inverter 5I2. An input clock CLK connects to respective inputs of NAND Gates 5NA5 and 5NA6. The output of the NAND Gate 5NA6, whose other. The input clock CLK connects to respective input of NAND Gates 5NA5 and 5NA6. The output of the NAND Gate 5NA6, its other input connecting to a system clock CK1, connects with respective inputs of the NAND Gate 5NA3 and the NOR Gate 5N1; the output of the NAND Gate 5NA5, its other input connecting to a system clock CK2, connects, via an inverter 5I9, with the outputs of inverters 5I7 and 5I4 and the NAND Gate 5NA1. The clock CK2 connects to the output of an inverter 5I12 and to the input of the NAND Gate 5NA5 and also connects to the respective outputs of inverters 5I3 and 5I6.

The output of the NAND Gate 5NA3 connects to one of its inputs via the inverter 5I6 and also connects, via inverters 5I7 and 5I8, with respective inputs of the OR Gate 5R1 and AND Gate 5A2. The output of the NOR Gate 5N1 connects to one of its own inputs through an inverter 5I3 and also connects via the inverter 5I4 with the other input of the OR Gate 5R1, and the output of the NAND gate 5NA1 connects, along with the output of the OR Gate 5R1, to the inputs of the NAND Gate 5NA4 and also connects to an input of the AND Gate 5A2. The output of the NAND Gate 5NA4 and the system clock CK1 connect to respective inputs of the AND Gate 5NA1. The output of the AND Gate 5A2, whose inputs respectively receiving the system clock CK1 and the outputs of the inverter 5I8 and the NAND Gate 5NA1, connects, along with the output of the NOR Gate 5N2, to the NOR Gate 5N3 at its two inputs. The output of the NOR Gate 5N2, whose two inputs respectively receiving the outputs of the AND Gate 5A1 and the NOR Gate 5N3, connects through the inverters 5I11 and 5I12 with the system clock CK2 and also gives PWM output.

With the above described construction of the invention including counters 30 and comparison/correction circuits 40 respectively in the number corresponding to the number of bits, the control circuit 20, the PWM data register 60 and the modulator 50, operation and effects shall be described in reference to the drawings.

Referring to a 8-bits programmable subframe system PWM circuit as in FIG. 1, the control circuit 20 as in FIG. 1, determines the number of subframes by means of the bits data of the control register 20a and generates control signals according to the number of subframes, as shown in the following Table (1).

TABLE 1

Determination of Numbers of Subframes and Output States of Control Circuit

| Control Register (20a) output | Number of subframes | C7 | C6 | C5 | C4 | C3 | C2 | C1 | C0 |
|---|---|---|---|---|---|---|---|---|---|
| 0 (000) | 1 | 1 | 1 | 1 | 1 | 1 | 1 | 1 | 1 |
| 1 (001) | 2(2') | 1 | 1 | 1 | 1 | 1 | 1 | 1 | 0 |
| 2 (010) | 4($2^2$) | 1 | 1 | 1 | 1 | 1 | 1 | 0 | 0 |
| 3 (011) | 8($2^3$) | 1 | 1 | 1 | 1 | 1 | 0 | 0 | 0 |
| 4 (100) | 16($2^4$) | 1 | 1 | 1 | 1 | 0 | 0 | 0 | 0 |
| 5 (101) | 32($2^5$) | 1 | 1 | 1 | 0 | 0 | 0 | 0 | 0 |
| 6 (110) | 64($2^6$) | 1 | 1 | 0 | 0 | 0 | 0 | 0 | 0 |
| 7 (111) | 128($2^7$) | 1 | 0 | 0 | 0 | 0 | 0 | 0 | 0 |

As shown in FIG. 3, the counter circuit 30 receives clocks from the comparison/correction circuit 40 to perform count-ups and returns overflows to the circuit 40.

The comparison/correction circuit 40, as shown in FIG. 4, receives control signals C7–C0 from the control circuit 20 and determines the sequence for connection of the counter 30.

For example, when the number of subframe is 1, the counter is connected in a common way. With clock CLK received, connections are made in the order of CNB0→CNB1 . . . →CNB7 to give output UCAm to the modulator 50. When the number of subframes is 8, that is when the control signal C7–C0 is "11111000", and the clock CLK is received, connections are made in the sequence of CNB3→CNB4→. . →CNB7 to obtain the overflow output UCAm of the highest bit of counter, and with the overflow output UCAm again applied to the counter CNB2→CNB1→CNB0 to make counting.

In the control signals C7–C0, "1" bits are used for PWM data of subframes while "0" bits are used for determination of correction subframes.

In FIG. 4, when under the control signal Ci=1, each bit receives the clock and the overflow UCAi-1 of the lower bit to give CAINi to the counter (30) and receives an overflow (CAIUTi) from the counter (30) to generate output signal (UCAi); however when Ci=0, the highest bit of overflow (UCAm) or the highest bit of overflow (CAOUTi) is received from counter (30) to generate the output signal (LCAi).

The data bit (Ci=1) of subframe sets EQi when the PWM data bit (PWDRi) is identified to the value of counter (CNTi) after comparing each other.

When EQi is high, the comparison of the higher bits is accomplished, that is, when each bit value of counter corresponding to dot bit part (Ci=1) of subframe is identified to the bit value of PWM data, EQM is set.

The determined bit part (Ci=1) of supplement subframe sets the supplement signal (CMPi) when PWM data bit (PWDRi) is "1", the bit value (CNTi) of counter is "1" and signal CMEi+1 of higher bit is "0".

CMEi becomes "0" and supplement signal of lower supplement bit can be generated when bit value of counter of supplement bit is "0". Therefore when the counter value of the higher bits (it corresponds to the lower bit in connection with counter) among the supplement bits are all "0", CMPi is generated. After OR gating each CMPi at CMP OR gate (70), the supplement signal CMP is produced.

When the value of the counter 30 and the PWM data register 60 are the same "1" and the higher counter values of the correction bits are all "0", the bit for determination of correction subframe generates the correction signal CMPi and performs OR operation at CMP OR Gates 70 to produce the correction signal CMPj.

The modulator 50 in FIG. 5 receives the highest bit overflow UCAm of the comparison/correction circuit 40 to set an output (initial value) and receive the equivalence signal EQM to reset the output. However, when "CMP=1", the correction signal corrects the PWM data value by one cycle (input clock) to reset the output.

Figure 6:
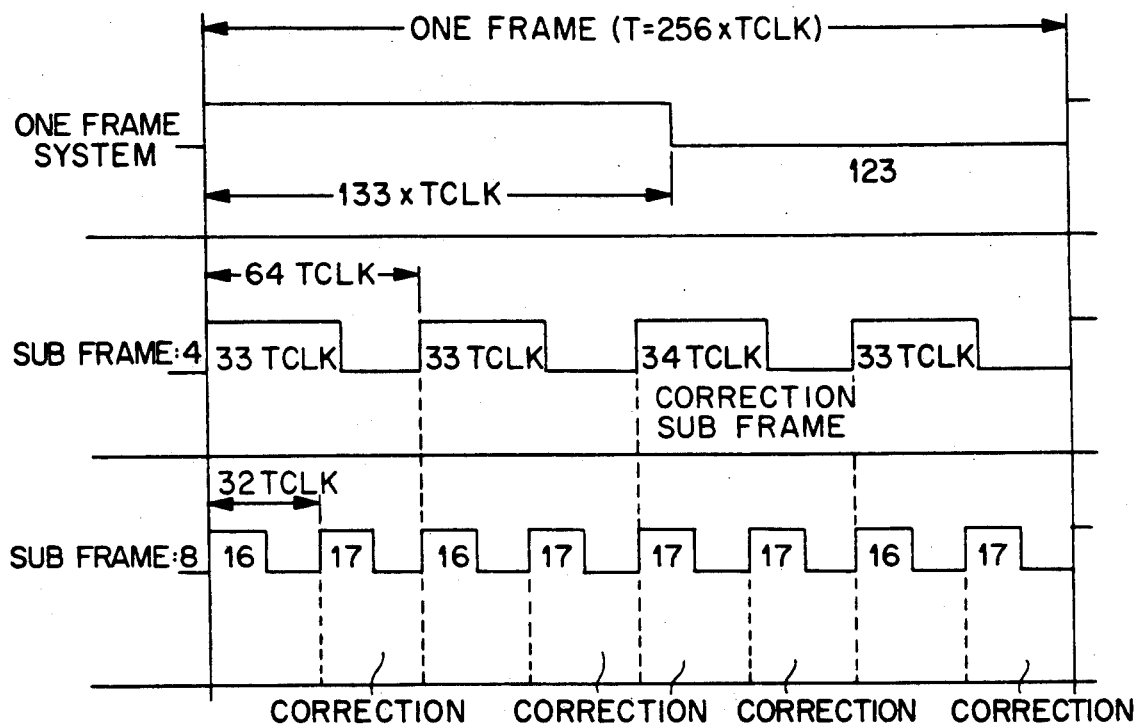
FIG. 6 illustrates output examples of 8-bit programmable subframe system in FIG. 1.

FIG. 6 shows outputs respectively for the numbers of subframes being "4" or "8" when the PWM data register's (60) value is 85(16)[85(16)=1000 0101(2)].

Figure 7:
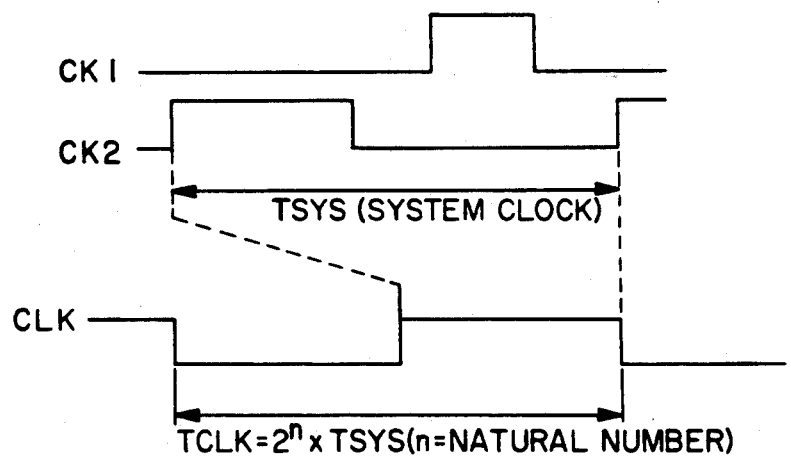
FIG. 7 illustrates the relation between the system clock and the input clock in FIG. 1.
Figure 8:
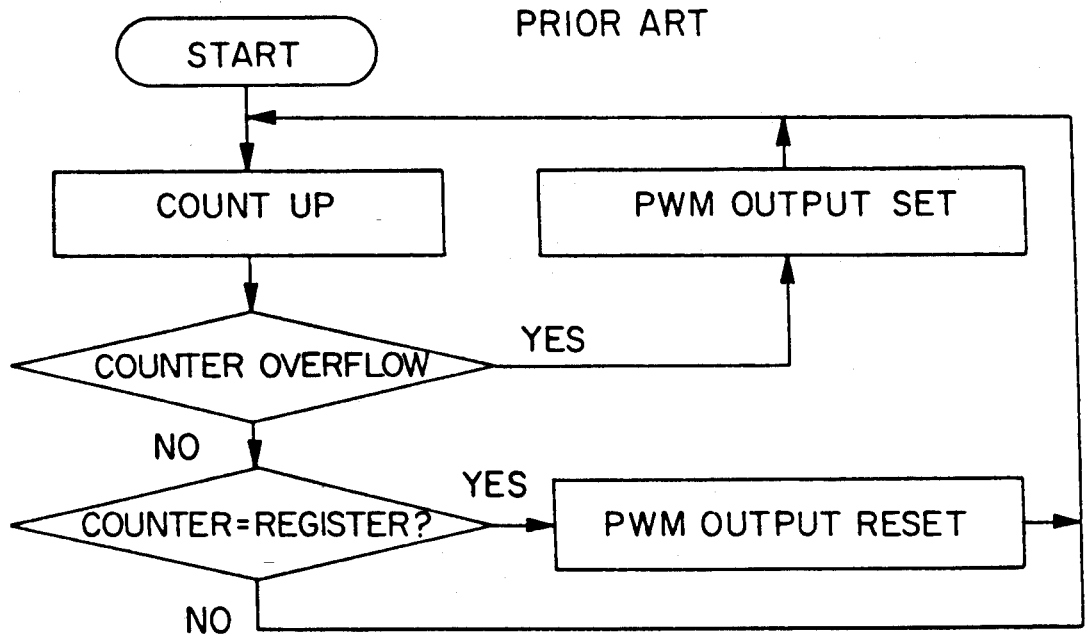
FIG. 8 is a flow chart of a conventional PWM system.

In FIG. 7, showing an example for system clocks CK1 and CK2 and an input clock CLK, the input clock CLK is the signal of a system clock divided by N and the clock timing is illustrated when the length of "High" level is one system clock.

The present invention of the above programmable subframe system PWM circuit makes subframes to be programmable for PWM so that a hardware may perform modulation in various forms in addition to normal functions. When employed for a microcomputer unit (MCU), its application to diverse uses may bring varied modifications for substitutional functions, and unless used simultaneously, the circuit may be used to function like a number of PWM circuits.

What is claimed is:

1. A PWM circuit of a programmable subframe system comprising a control circuit (20) for generating control signals (Cm-CO) according to a number of subframes; a PWM data register (60) for storing PWM data; a comparison/correction circuit (40) that receives said control signals (Cm-CO) from said control circuit (20) to determine a sequence of connections of a counter (30) and then compare a value of said counter (30) with a value of a register (60) to generate overflows ((UCAm-UCAO) and (LCAm-LCAO)) under the control of said control signals (Cm-CO) and also simultaneously generate correction signals (CMPm-CMPO), said counter (3) for counting-up to return said overflows to said comparison/correction circuit (40); an OR Gate (70) for OR operating said correction signals (CMPm-CMPO) generated in said comparison/correction circuit (40); a modulator (50) that receives a highest bit overflow (UCAm) to set a (PWM) output and then receives an equivalence signal (EQm) to reset said output and also receives said OR operated correction signals (CMP) from said OR circuit (70) to provide correction for said output.

2. A PWM circuit of a programmable subframe system, comprising a control circuit for generating control signals (Cm-CO) according to a number of subframes; a PWM data register for storing PWM data; a comparison/correction circuit that receives said control signals (Cm-CO) from said control circuit to determine a sequence of connections of a counter and then compare a value of said counter with a value of a register to generate overflows ((UCAm-UCAO) and (LCAm-LCAO)) under the control of said control signals (Cm-CO) and also simultaneously generate correction signals (CMPm-CMPO); said counter for counting-up to return said overflows to said comparison/correction circuit; an OR gate for OR operating said correction signals (CMPm-CMPO) generated in said comparison/correction circuit; a modulator that receives a highest bit overflow (UCAm) to set a (PWM) output and then receives an equivalence signal (EQm) to reset said output and also receives said OR operated correction signals (CMP) from said OR circuit to provide correction for said output.

* * * * *